United States Patent

Maffeis et al.

[11] Patent Number: 6,092,848
[45] Date of Patent: Jul. 25, 2000

[54] PNEUMATIC PARALLEL OR RADIAL GRIPPER

[75] Inventors: Giuseppe Maffeis; Giuseppe Bellandi, both of Roncadelle, Italy

[73] Assignee: Gimatic S.p.A., Italy

[21] Appl. No.: 09/201,347

[22] Filed: Dec. 1, 1998

[51] Int. Cl.[7] .................................................... B66C 1/42
[52] U.S. Cl. ........................................ 294/88; 294/119.1
[58] Field of Search .................... 294/88, 119.1, 294/93, 94; 901/37

[56] References Cited

U.S. PATENT DOCUMENTS

| | | | |
|---|---|---|---|
| 3,075,800 | 1/1963 | Rowekamp | 294/88 |
| 4,234,223 | 11/1980 | O'Neil | 294/88 |
| 4,566,727 | 1/1986 | Yuda | 294/88 |
| 4,728,137 | 3/1988 | Hamed et al. | 294/88 |
| 4,892,344 | 1/1990 | Takada et al. | 294/88 |

FOREIGN PATENT DOCUMENTS 406031673  2/1994  Japan .................. 294/88

*Primary Examiner*—Dean J. Kramer
*Assistant Examiner*—Paul T. Chin
*Attorney, Agent, or Firm*—McGlew and Tuttle, PC

[57] ABSTRACT

A pneumatic parallel or radial gripper or air gun having two or more gripping jaws, wherein at least the gripping jaws their connection to the controlling piston are pre-assembled on a support that is made of plastic material. This allows for the subsequent assembly en bloc on the body in correlation with the piston. The support also acts as a device of protection.

4 Claims, 3 Drawing Sheets

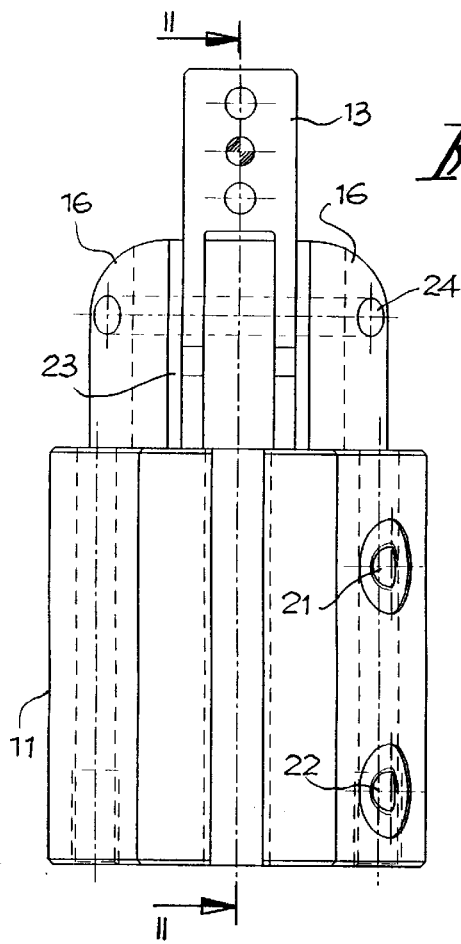
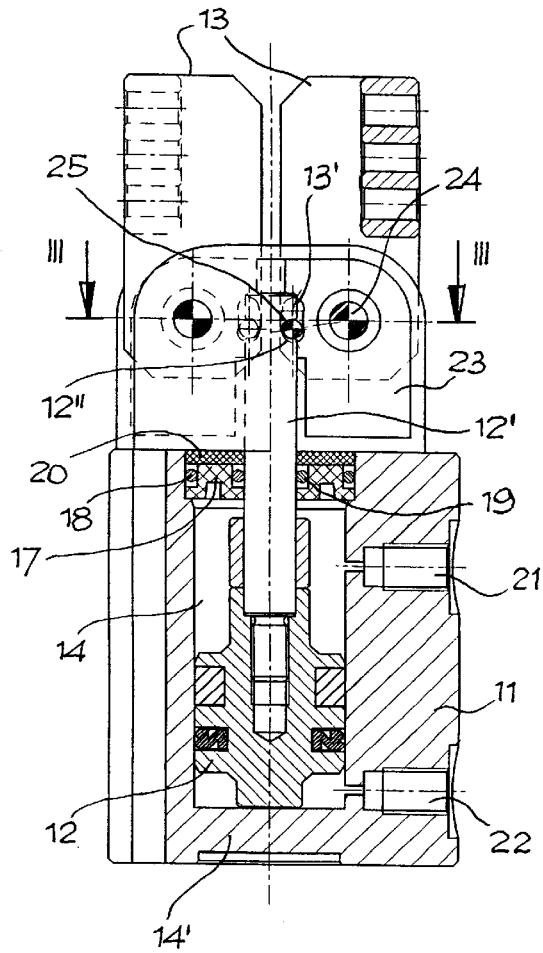
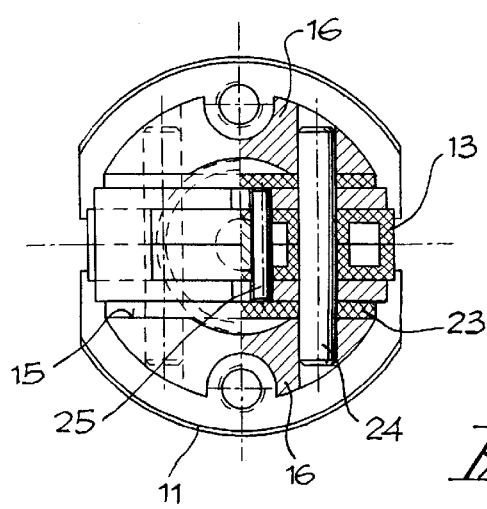

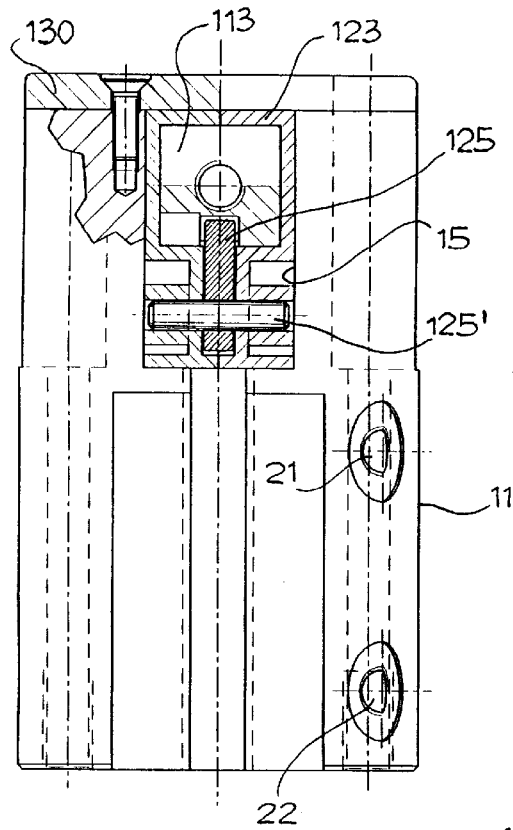
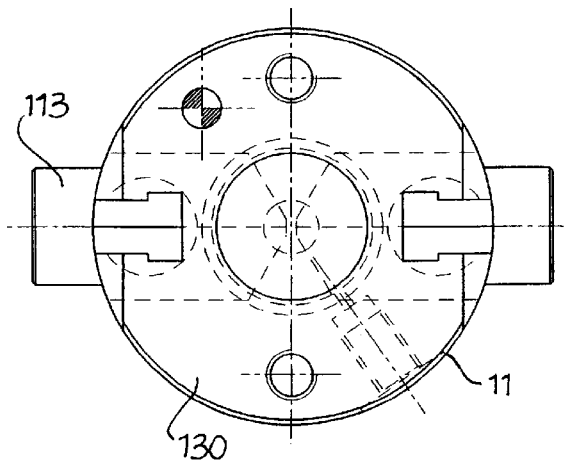
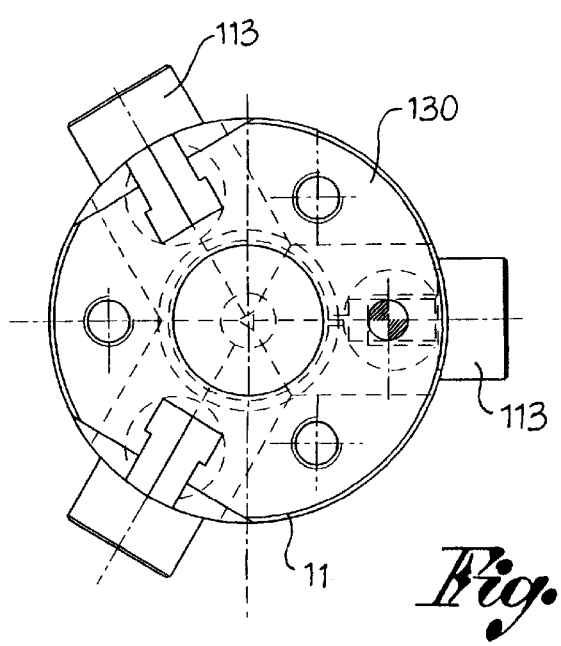

US 6,092,848

PNEUMATIC PARALLEL OR RADIAL GRIPPER

FIELD OF THE INVENTION

The present utility model pertains to parallel or radial air guns or pneumatic gripper with two or more gripping jaws, which are controlled by a single reciprocating piston by a kinematic mechanism of transmission, which is able to convert the movements of the piston into angular or rectilinear movements of opening and closing of the gripping jaws.

BACKGROUND OF THE INVENTION

Many embodiments of air actuated grippers of the above-mentioned type have become known already. However, they do comprise a plurality of components, whose manufacture and whose assembly involve specific work and measures, as well as not identical performance times, which may be detrimental to the simplicity of the structure and of the production costs of the gripper.

SUMMARY AND OBJECTS OF THE INVENTION

The primary object of the present invention is to provide an air actuated gripper with such components embodied simply by molding, which are suitable for pre-assembly of the functional elements for their subsequent application en bloc and essentially without screws on the gun body. Moreover, such components made of plastic material also perform a function of protection and tightness against the penetration of dust or another material for the protection of the internal parts of the system.

According to the invention, a parallel or radial air gripper with two or more gripping jaws is provided including a body with a chamber fed by a pneumatic fluid under pressure. A piston is housed and can be moved in a reciprocating manner in the chamber by means of a pneumatic fluid. Two or more gripping jaws are controlled by the piston by means of a connecting device which are able to convert the movements of the piston into angular or rectilinear movements for opening and closing the gripping jaws. At least the gripping jaws and the connecting devices are preassembled on a support made of plastic material for their subsequent assembly en bloc on the gripper body in correlation with the piston.

The particular shaping and combination of the elements of the air gripper according to the present invention contribute to limiting the machining work of the gripper body, to lowering the cost of the pieces, to reducing times and costs for assembling the gripper, to making it possible to produce grippers with two or three gripping jaws, even with a different kinematic mechanism of movement, starting from the same functional elements and without additional work.

Moreover, the components that are made by molding can be made of a plastic material, shaped to be joined complementarily together with functional elements to be pre-assembled and with the gripper body, and being able to self-lubricate and thus to reduce, if not exactly to eliminate, the wear of the elements. This has the overall advantage of less maintenance and a greater duration of the tool.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a side view of an air gun or pneumatic gripper with two angular gripping jaws;

FIG. 2 is an axial sectional view of the gun according to the line II—II in FIG. 1;

FIG. 3 is a partial cross sectional view of the gun according to the line III—III in FIG. 2;

FIG. 7 is a partial sectional view of the gun according to the arrows VII—VII in FIG. 6;

FIG. 8 is a plane view of the gun of FIGS. 6 and 7; and

FIG. 9 is a plane view of a gun with three radial gripping jaws with a kinematic mechanism of control, but like that of the gun with the two gripping jaws.

DESCRIPTION OF THE PREFERRED EMBODIMENTS

Figure 4:
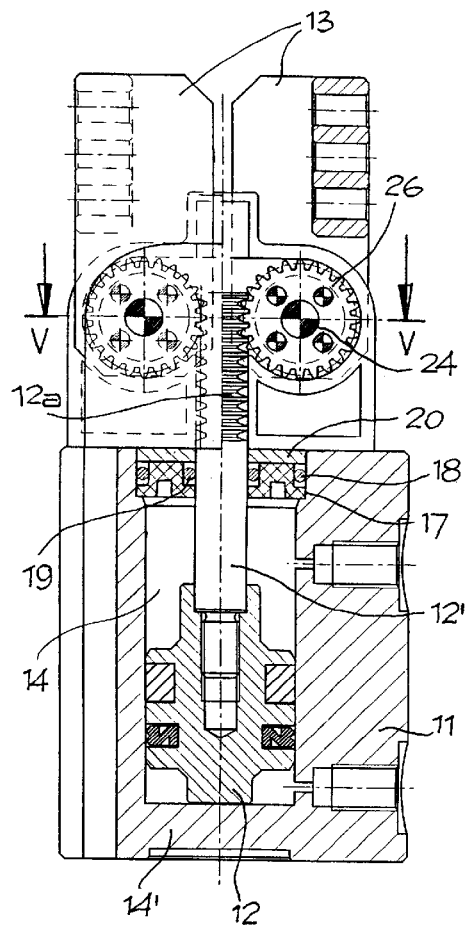
FIG. 4 is a vertical sectional view similar to FIG. 2, but of an air gun with a different kinematic mechanism of control of the two angular gripping jaws.

Referring to the drawings and in particular to FIGS. 1–5, a preferred embodiment of the gun or gripper according to the invention essentially comprises a body 11, a pneumatic piston 12, and two gripping jaws 13, which are able to make angular movements in opposite directions, and each of which carries a pressing jaw (not shown).

The body is made of a metallic material and is machined in order to define a chamber 14 in which the piston 12 is housed and slides, and above the chamber, a space 15 is delimited by two shoulders 16, which are made in one piece with the body. The chamber 14 has a bottom 14' and on the opposite part is closed by a first flange 17 with the aid of seals 18, 19 and a second flange 20 on the first one. In the body 11, on one side of the chamber 14, are provided two holes 21, 22, to which are connected the ducts for the supply of the pneumatic fluid under pressure controlled by the piston by its reciprocating movements.

The piston 12 has a rod 12' which is intended to control the gripping jaws 13. The rod 12' is guided in a tight manner by means of the flanges 17 and 20, and protrudes into the space 15 between the two shoulders 16 of the body 11.

For their part, the gripping jaws 13 are pre-assembled on a support 23 made of plastic material. This support 23 consists of two complementary shells that are obtained by molding and that enclose the gripping jaws like a sandwich.

The support 23 complete with gripping jaws 13 is inserted into the space 15 between the shoulders 16 of the body 11. Then, in coinciding holes made in the shoulders 16, in the support 23 and in the gripping jaws 13, are inserted the bolts 24, which form the axes of rotation of the gripping jaws and at the same time form the means for connecting the support 23 to the body 11.

In the embodiment which is shown in FIGS. 1–3, the rod 12' of the piston 12 controls the rotation of each gripping jaw 13 by means of a connecting pin 25, which engages, on the one hand, with a cavity 12" on the rod 12' and, on the other hand, with a space 13' in the gripping jaw 13.

The pins 25 are applied to the gripping jaws when they are pre-assembled on the support 23.

Figure 5:
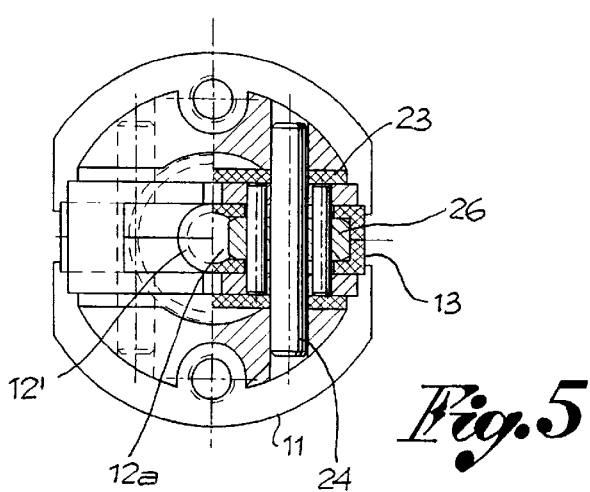
FIG. 5 is a partial cross sectional view according to the line V—V in FIG. 4.

In the embodiment of FIGS. 4 and 5 the rod 12' has a peripheral toothing 12a, and on the other hand, to each gripping jaw 13 is fixed a toothed wheel 26, which rotates on the bolt of the gripping jaw which meshes with the toothing 12a of the rod in such a way that the opening and closing rotations of the gripping jaws correspond to the reciprocating movements of the piston. Also in this case the toothed wheels shall be fixed to the gripping jaws before their pre-assembly on the support 23.

Figure 6:
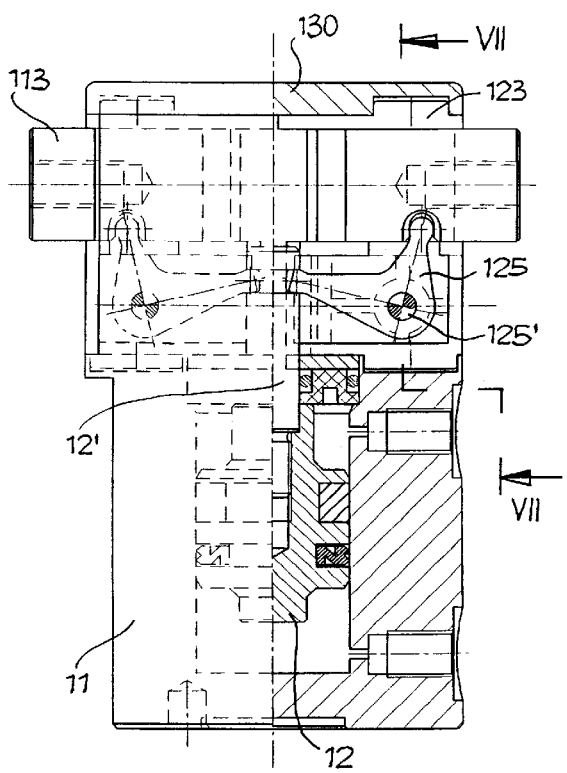
FIG. 6 is a front view in partial section of a gun with two radial gripping jaws.

The gripper shown in FIGS. 6 and 9 also has a body 11 and a piston 12 as the gripper in FIGS. 1–5, but it differs in that the gripping jaws 113, of which there may be two (cf. FIG. 8) or three (cf. FIG. 9), are able to make rectilinear movements in radial directions in the body 11. For this purpose, each gripping jaw 113 is controlled by the rod 12' of the piston 12 by means of a connecting lever 125, which pivots on the bolt 125'.

In this embodiment as well the gripping jaws 113 and the connecting levers 125 are pre-assembled on a support 123 made of plastic material, which consists of at least two complementary shells.

The support complete with gripping jaws and connecting levers is then assembled in a space between shoulders which are made in one piece with the body 11, and is held there by means of a cover 130, which is fixed to the top of the shoulders and with the aid of possible centering spot-facings.

While specific embodiments of the invention have been shown and described in detail to illustrate the application of the principles of the invention, it will be understood that the invention may be embodied otherwise without departing from such principles.

What is claimed is:

1. A parallel or radial air actuated gripper with two or more gripping jaws, comprising a body with a chamber fed by a pneumatic fluid under pressure, said body including shoulders formed in one piece with said body;

a piston which is housed and can be moved in a reciprocating manner in said chamber by means of the pneumatic fluid;

a support made of plastic material; and two or more gripping jaws controlled by said piston by connecting devices which are able to convert the movements of said piston into linear, radial movements for opening and closing said gripping jaws, at least said gripping jaws and said connecting devices are pre-assembled on said support made of plastic material for their subsequent assembly en bloc on said body in correlation with said piston and are held by means of a cover which is fixed to the top of said shoulders.

2. The air gripper in accordance with claim 1, wherein said support includes at least two shells, between which said gripping jaws and said connecting devices are mounted, and said support is arranged and held in a space defined by said shoulders.

3. The air gripper in accordance with claim 2, wherein said connecting devices are formed by a pivoting lever for each said gripping jaw, said lever being mounted on an oscillating bolt and engaging with the respective gripping jaw, and with a rod that is made in one piece with the controlling piston.

4. The air gripper in accordance with claim 1, wherein said connecting devices are formed by a pivoting lever for each said gripping jaw, said lever being mounted on an oscillating bolt and engaging with the respective gripping jaw, and with a rod that is made in one piece with the controlling piston.

* * * * *